(12) United States Patent  
Seal

(10) Patent No.: US 6,707,670 B2
(45) Date of Patent: Mar. 16, 2004

(54) SYSTEMS AND METHODS FOR MOUNTING DEVICES

(75) Inventor: Lowell Seal, Reisterstown, MD (US)

(73) Assignee: Dorsal Networks, Inc., Columbia, MD (US)

(*) Notice: Subject to any disclaimer, the term of this patent is extended or adjusted under 35 U.S.C. 154(b) by 351 days.

(21) Appl. No.: 09/949,933

(22) Filed: Sep. 12, 2001

(65) Prior Publication Data

US 2003/0048049 A1 Mar. 13, 2003

(51) Int. Cl.$^7$ ................................................. H05K 7/20
(52) U.S. Cl. .................. 361/704; 361/707; 361/716; 361/740; 361/741; 361/784; 174/52.1
(58) Field of Search ................. 361/704, 707, 361/716, 721, 729, 732, 740, 741, 784; 174/52.1

(56) References Cited

U.S. PATENT DOCUMENTS

| | | | | |
|---|---|---|---|---|
| 4,076,353 A | * | 2/1978 | Barlow | 312/350 |
| 4,528,615 A | | 7/1985 | Perry | 361/386 |
| 4,549,248 A | * | 10/1985 | Stoll | 361/760 |
| 4,680,674 A | * | 7/1987 | Moore | 361/686 |
| 4,819,713 A | | 4/1989 | Weisman | 165/1 |
| 5,251,099 A | * | 10/1993 | Goss et al. | 361/721 |
| 5,642,219 A | | 6/1997 | Ogiya et al. | 359/341 |
| 5,791,403 A | | 8/1998 | Chiou | 165/80.3 |
| 6,176,641 B1 | | 1/2001 | Schenk | 403/381 |
| 6,233,239 B1 | * | 5/2001 | Benayoun et al. | 439/157 |
| 6,278,612 B1 | * | 8/2001 | Kummle et al. | 361/719 |
| 6,292,364 B1 | * | 9/2001 | Fitzgerald et al. | 361/699 |
| 6,404,636 B1 | * | 6/2002 | Staggers et al. | 361/704 |
| 6,469,247 B1 | * | 10/2002 | Dodds et al. | 174/50 |

OTHER PUBLICATIONS

AT&T Technical Journal: A Journal of the AT&T Companies, vol. 74, No. 1, Jan./Feb. 1995, 106 pages.

* cited by examiner

Primary Examiner—Boris Chervinsky
(74) Attorney, Agent, or Firm—Harrity & Snyder, LLP

(57) ABSTRACT

A retainer includes a device having at least one dovetail-shaped portion, a frame configured to receive the dovetail-shaped portion, and at least one expanding device. The expanding device is configured to compress the dovetail-shaped portion against the frame, thereby securing the device against the frame.

31 Claims, 9 Drawing Sheets

US 6,707,670 B2

SYSTEMS AND METHODS FOR MOUNTING DEVICES

BACKGROUND OF THE INVENTION

1. Field of the Invention

The present invention relates generally to retainers and, more particularly, to systems and methods for mounting devices using dovetail grooves and expanders.

2. Description of Related Art

Network devices commonly include non-compliant retainers, such as wedge locks, that lock circuit boards or other devices into position. These non-compliant retainers, however, do not allow for mounting of the circuit boards or other devices in a cantilevered state, such that the plane of the circuit board assembly or other device is supported only at one end or edge. Moreover, the network devices are not configured to allow for multiple wedge locks to be implemented in a coplanar fashion.

Accordingly, there is a need in the art for systems and methods that improve the retention of circuit boards or modules in a network device.

SUMMARY OF THE INVENTION

Systems and methods consistent with the present invention address this and other needs by using an expanding device, such as a wedge lock, to retain a processing module having a dovetail portion within a frame.

In accordance with the principles of this invention as embodied and broadly described herein, an optical processing device includes a group of processing modules, a frame, and an expanding device. A portion of each of the processing modules is configured in a dovetail shape. The frame is configured to receive the dovetail end of the processing modules. The expanding device is configured to lock the dovetail end of the processing modules to the frame.

In another implementation consistent with the present invention, a retainer includes a device having a dovetail-shaped portion, a frame configured to receive the dovetail-shaped portion, and at least one expanding device configured to compress the dovetail-shaped portion against the frame.

In yet another implementation consistent with the present invention, a method for retaining a device, having a dovetail portion, in a frame is provided. The method includes attaching at least one expanding device to the dovetail portion or the frame, sliding the dovetail portion into the frame, and expanding the at least one expanding device to retain the dovetail portion in the frame.

In a further implementation consistent with the present invention, a method for dissipating heat from a processing module, having a dovetail portion, to a frame is provided. The method includes attaching at least one expanding device to the dovetail portion or the frame, inserting the dovetail portion into the frame, and expanding the at least one expanding device to bring the dovetail portion into contact with the frame and allow for heat dissipation from the processing module to the frame.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the present invention provide a dovetail interface for retaining modules within a frame of an underwater device. In an exemplary embodiment, an expanding device is attached to the frame of the underwater device. A dovetail portion of a processing module may be inserted within a receiving portion of the frame. Upon expansion of the expanding device, the dovetail portion is brought into compression with the receiving portion of the frame. Such a configuration enhances the dissipation of heat to the surrounding frame.

Exemplary System Configuration

Figure 1:
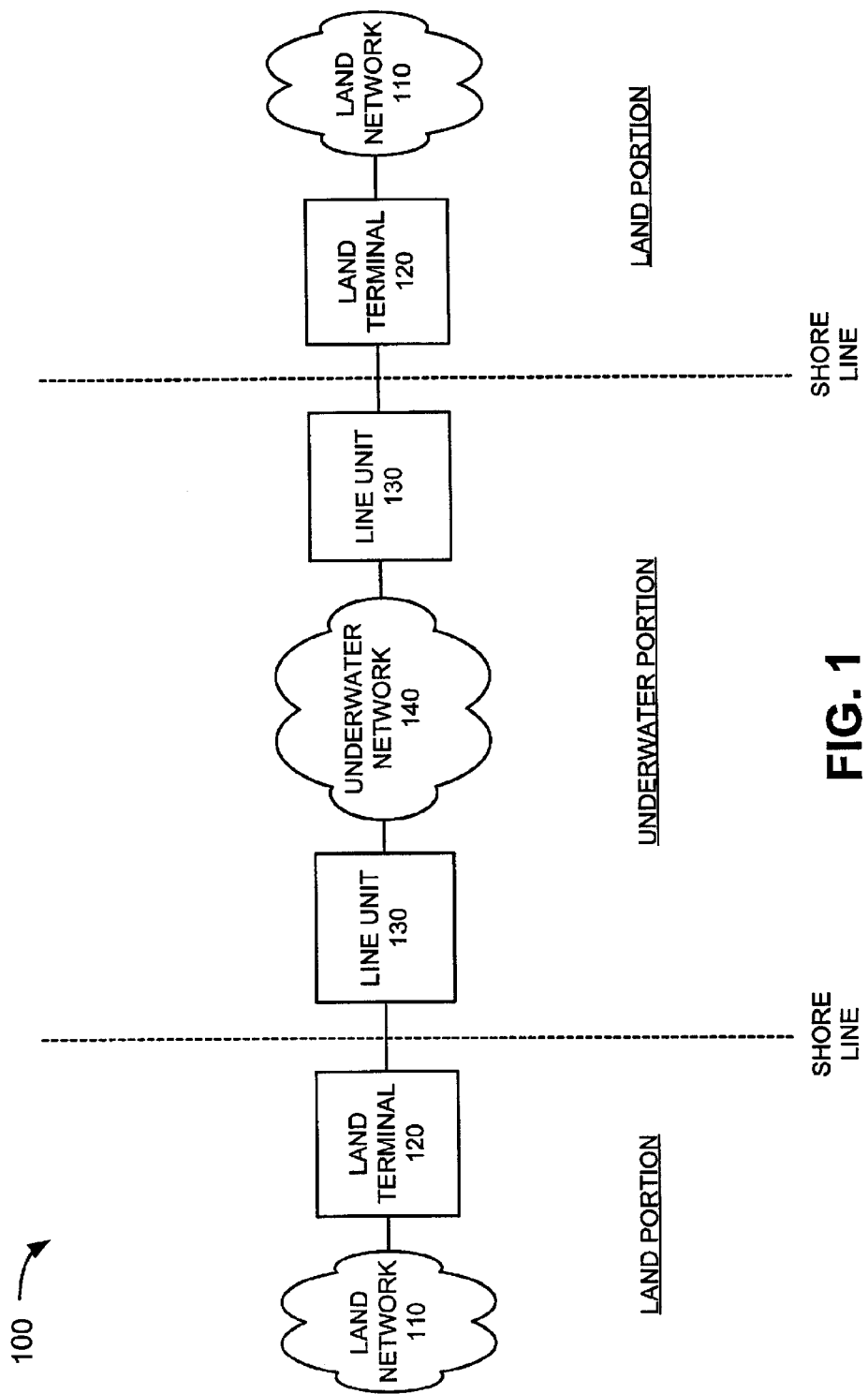
FIG. 1 illustrates an exemplary system in which systems and methods consistent with the present invention may be implemented.

FIG. 1 illustrates an exemplary system 100 in which systems and methods consistent with the present invention may be implemented. As illustrated, system 100 includes two land communication portions that are interconnected via an underwater communication portion. The land portions may include land networks 110 and land terminals 120. The underwater portion may include line units 130 (sometimes referred to as "repeaters") and an underwater network 140. Two land networks 110, land terminals 120, and line units 130 are illustrated for simplicity. It will be appreciated that a typical system may include more or fewer devices and networks than are illustrated in FIG. 1.

The land network 110 may include one or more networks, such as the Internet, an intranet, a wide area network (WAN), a local area network (LAN), or another type of network. Land terminals 120 include devices that convert signals received from the land network 110 into optical signals for transmission to the line unit 130, and vice versa. The land terminals 120 may connect to the land network 110 via wired, wireless, or optical connections. In an implementation consistent with the present invention, the land terminals 120 connect to the line units 130 via an optical connection.

The land terminals 120 may include, for example, long reach transmitters/receivers that convert signals into an optical format for long haul transmission and convert underwater optical signals back into a format for transmission to the land network 110. The land terminals 120 may also include wave division multiplexers and optical conditioning units that multiplex and amplify optical signals prior to transmitting these signals to line units 130, and line current equipment that provides power to the line units 130 and underwater network 140.

The underwater network 140 may include groups of line units and/or other devices capable of routing optical signals in an underwater environment. The line units 130 include devices capable of receiving optical signals and transmitting these signals to other line units 130 via the underwater network 140 or to land terminals 120.

Figure 2:
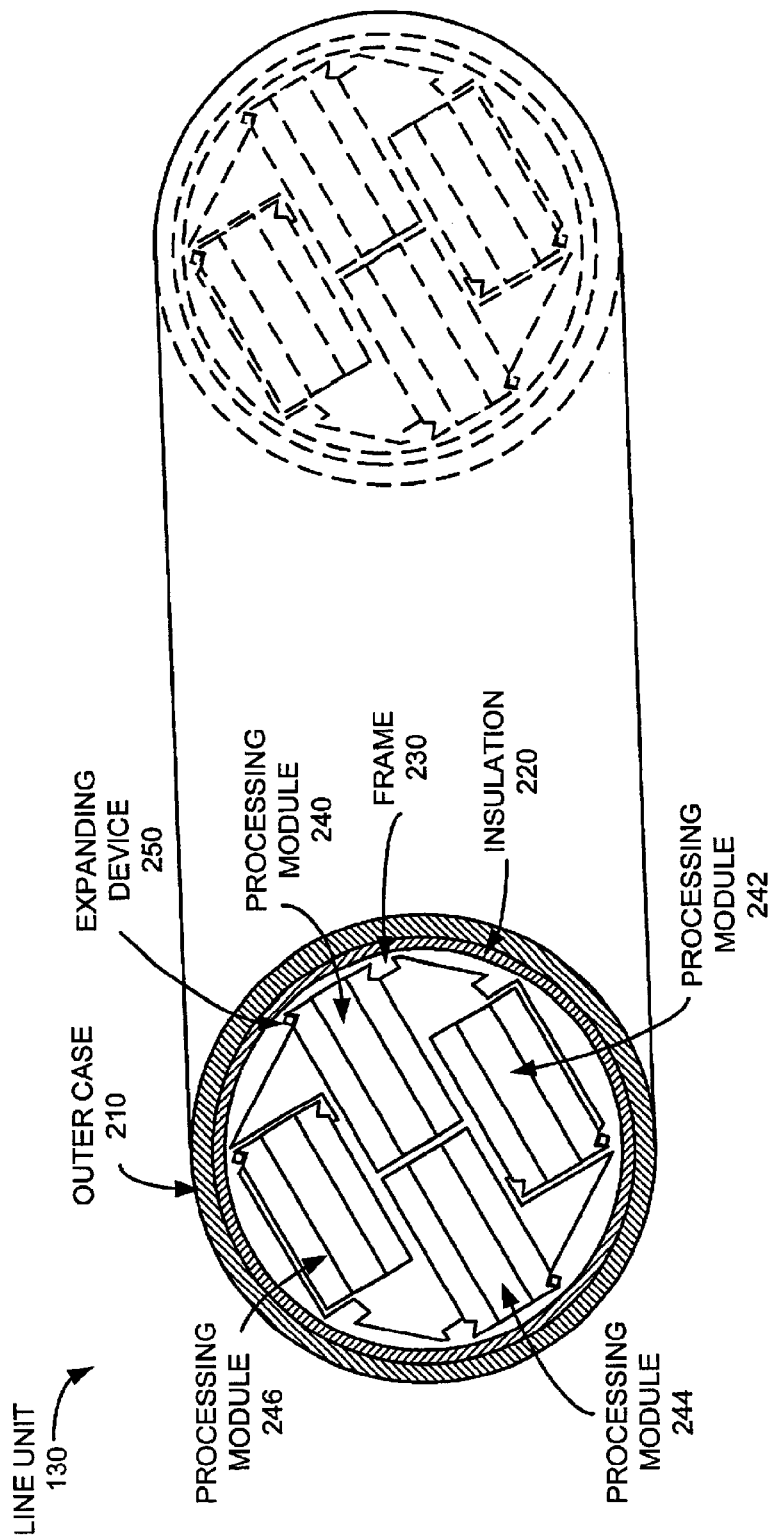
FIG. 2 illustrates an exemplary configuration of the line unit of FIG. 1.

FIG. 2 illustrates an exemplary configuration of the line unit 130 of FIG. 1. As illustrated, the line unit 130 may include an outer case 210, an insulating layer 220, a frame 230, groups of processing modules 240–246, and expanding devices 250. It will be appreciated that a typical line unit 130 may include other devices (not shown) that aid in the reception, processing, or transmission of optical signals.

The outer case 210 holds the electronic circuits needed for receiving and transmitting optical signals to other line units 130 and land terminals 120. The outer case 210 provides the electronic circuits with a pressure or watertight environment. As illustrated, the outer case 210 may be of a hollow cylindrical shape. Alternative configurations are also possible.

The outer case 210 may be fabricated of a high strength material, such as beryllium copper, aluminum, steel, or the like. In an underwater or undersea environment, such a material should be chosen that provides good heat transfer characteristics for dissipating heat from inside the line unit 130 to the surrounding water.

The insulation layer 220 electrically isolates the electronic circuits and circuit mountings within the line unit 130 from the outer case 210. The insulator 220 may be applied uniformly to the inside of the outer case 210 to a thickness to withstand expected high voltage within the line unit 130, but limited from any excessive thickness to maximize heat transfer through the insulator 220.

The frame (or chassis) 230 holds the processing modules 240–246 in place within the line unit 130. The frame 230 may also act as a heat sink for the processing modules 240–246 and as a heat conduit for the layer of insulation 220. The frame 230 may be constructed from a high conductivity material, such as aluminum.

The processing modules 240–246 may include electronic circuits for receiving, processing, and transmitting optical signals. The processing modules 240–246 may be positioned so that free space exists between adjacent ones of them, allowing them to be free of stress when the line unit 130 is in a high pressure location (e.g., at sea bottom). As will be described in more detail below, one end of each of the processing modules 240–246 may have a dovetail configuration that allows the processing module 240–246 to be slid into place within the frame 230 in which it is installed.

Figure 3:
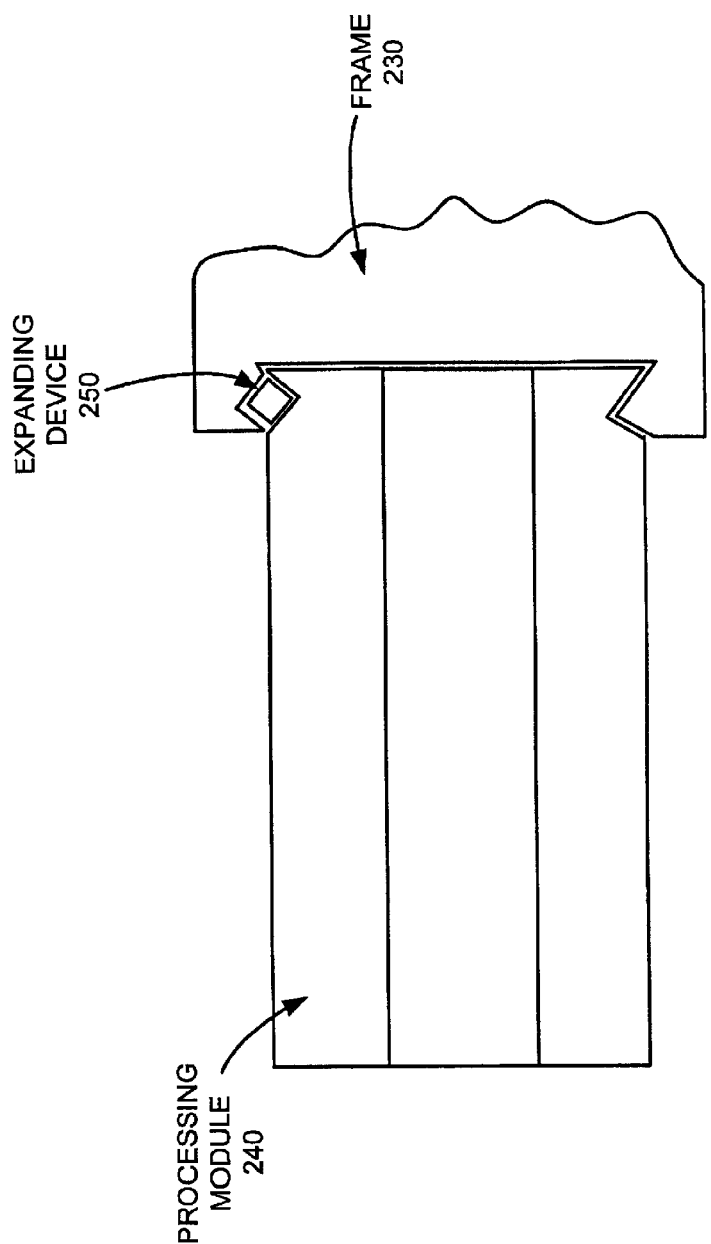
FIG. 3 illustrates an exemplary cross sectional view of the processing module/frame interface in an implementation consistent with the present invention.

The expanding devices 250 lock the processing modules 240–246 in place within the frame 230. With the expanding devices 250 in a relaxed (i.e., non-expanded) state, the processing modules 240–246 may slide freely into position within the frame 230. This allows for a loose fit and generous tolerances in the designs of both the processing modules 240–246 and the frame 230. As the expanding devices 250 are expanded, the interface between the processing modules 240–246 and the frame 230 is closed and put into compression. Keeping the processing modules 240–246 in intimate contact with the frame 230 assures good thermal conductivity. FIG. 3 illustrates this connection in greater detail.

As illustrated, a dovetail interface exists between the processing module (e.g., processing module 240) and the frame 230. The optimum angle of the dovetail may depend upon the mass of the processing module 240, the distance of the center of mass from the base of the sliding dovetail, the direction of any external loads, such as gravity, shock impulses, vibration, centripetal forces, and the like, the width of the sliding dovetail, the desired compression at the interface of the processing module 240 with the frame 230, and the load producing capability of the expanding device 250. In an implementation consistent with the present invention, the dovetail angles may be between 30 and 75 degrees. Generally, steeper dovetail angles allow for a wider interface between the processing module 240 and the frame 230, and the shallower the angle, the greater the compression force generated at the dovetail interface by the expanding device 250.

Figure 4:
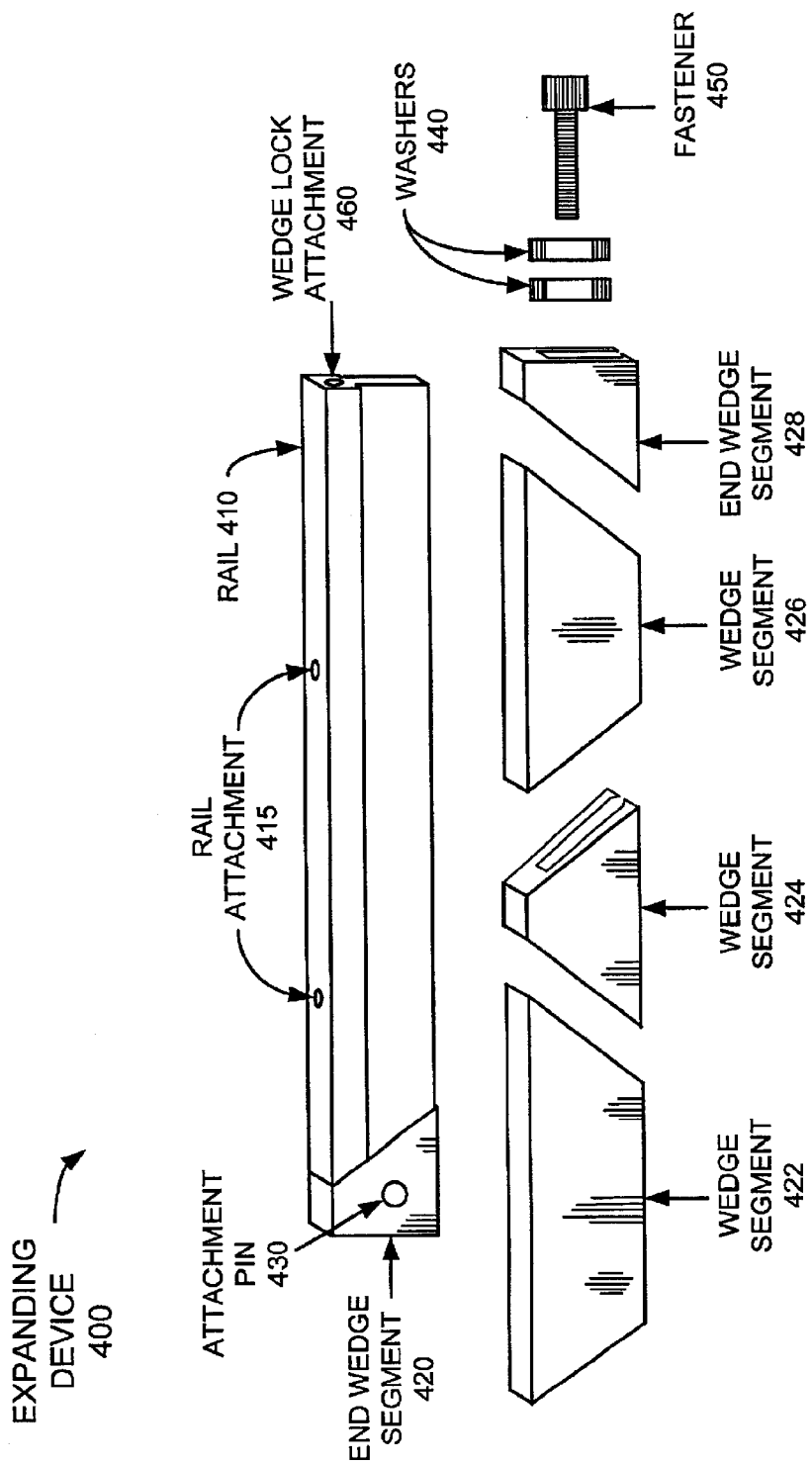
FIG. 4 illustrates an exemplary expanding device in an implementation consistent with the present invention.

FIG. 4 illustrates an exemplary expanding device 400 in an implementation consistent with the present invention. It will be appreciated that other expanding devices may alternatively be used. As illustrated, the expanding device 400 includes a rail 410, a group of wedge lock segments 420–428, washers 440, and a fastener 450.

The rail 410 allows for mounting of the wedge lock segments 420–428. The length and composition of the rail 410 may be selected so as to ensure that the expanding device 400 is capable of locking a processing module 240–246 into position within the frame 230. In one implementation consistent with the present invention, the length of the rail 410 may be approximately equal to the length of the line unit 130. The rail 410 may be configured to have a "T" bar-like cross-section along its length. Such a configuration allows the rail 410 to retain the wedge lock segments 420–428 once the wedge lock segments 420–428 are in place. Other configurations may alternatively be used. The rail 410 may be securely mounted to the frame 230 via screws, adhesives, rivets, or the like.

The wedge lock segments 420–428 may be of such a configuration as to allow the wedge lock segments 420–428 to slide onto and mate with the rail 410 in such a way that precludes the wedge segments 420–428 from becoming easily misaligned. In other words, the wedge segments 420–428 should not be able to rotate about the rail 410, or be removed from the rail 410 except by sliding them off an end of the rail 410. The wedge lock segments 420–428 may include ramped ends that allow the overall height of the expanding device 400 to be adjusted once the segments 420–428 are positioned on the rail 410. The number of wedge segments, and the length of each wedge segment, may be varied in accordance with the type or size of expanding device desired. The wedge lock segments 420–428 may be composed of aluminum or other similar types of heat conductive materials.

The washers 440 may include any conventional type of washers. The fastener 450 may be a screw or another type of fastening device capable of applying pressure to the wedge lock segments 420–428 in order to compress the various wedge segments 420–428 together and expand the expanding device 400 to the desired height.

The expanding device 400 may be assembled in the following manner. The rail 410 may be attached to the frame 230 or another appropriate surface, such as the processing module 240. As illustrated, the rail 410 may include a group of attachment holes 415 that allow the rail 410 to be mounted to the frame 230 via screws, rivets, and the like. Alternatively, the rail 410 may be mounted to the frame 230 through the use of adhesives.

The end wedge segment 420 may be attached to the rail 410 via an attachment pin 430 or other similar type of mechanism. The end wedge segment 420 serves to retain the other wedge segments 422–428 on the rail 410. The end wedge segment 420 may be attached to the rail 410 prior to or after the rail 410 has been mounted to the frame 230.

Once the end wedge segment 420 has been attached to the rail 410, the other wedge segments 422–426 and end wedge segment 428 may be slid onto the rail 410. As illustrated, the end wedge segment 428 may be configured with an unramped front end that allows the fastener 450 to apply pressure equally through the washers 440 to the wedge lock segments 420–428. The washers 440 and fastener 450 should be locked in place so as to prohibit loosening during use. This may be accomplished, for example, through the use of a mechanical locking device or a thread-locking adhesive.

Figure 5:
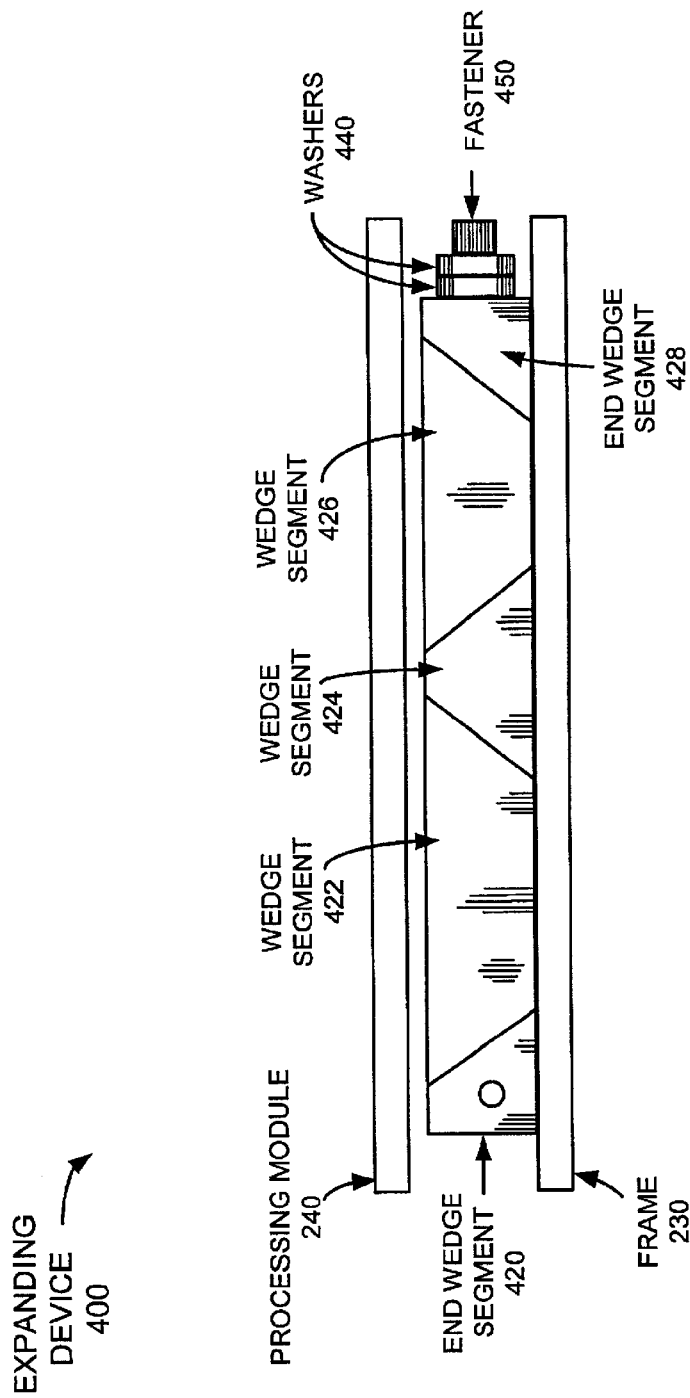
FIG. 5 illustrates the expanding device of FIG. 4 in an assembled, unexpanded state.
Figure 6:
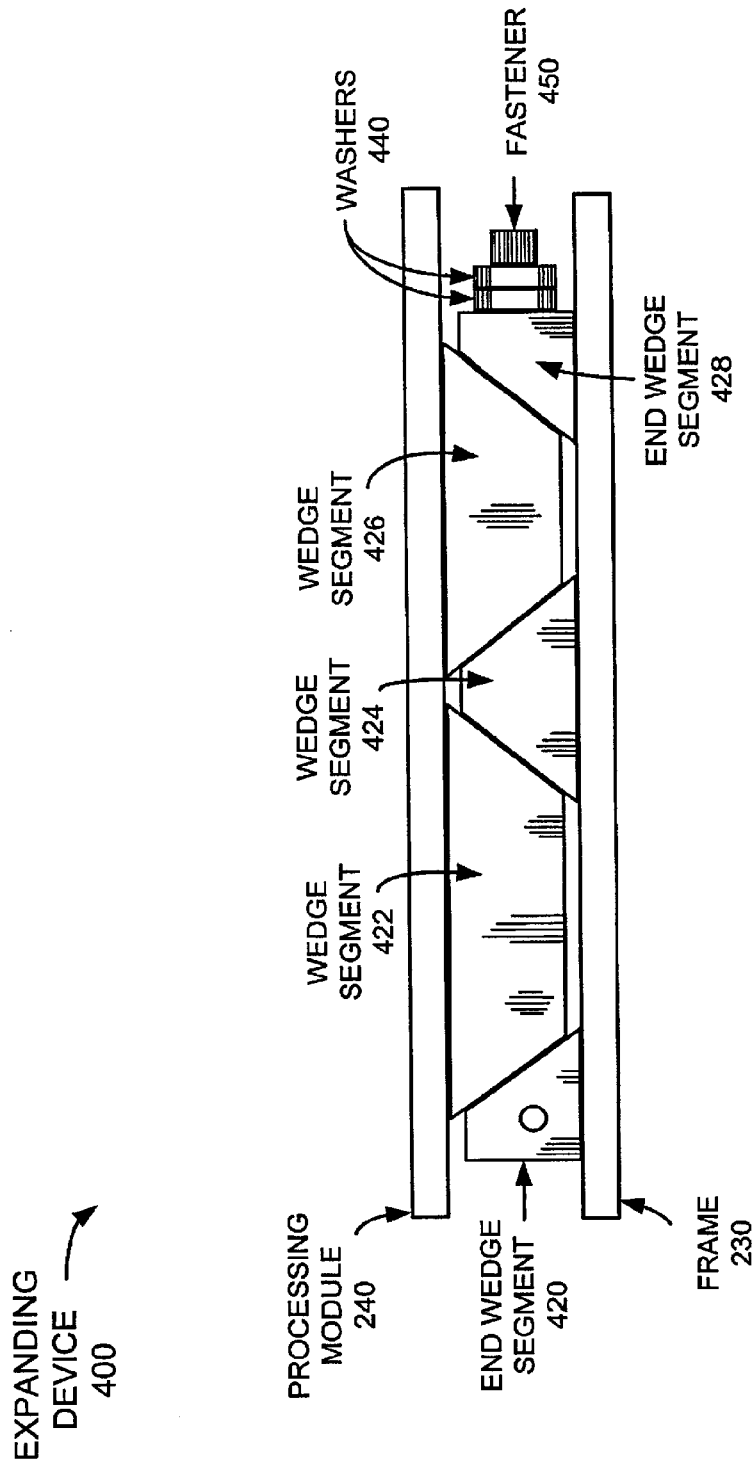
FIG. 6 illustrates the expanding device of FIG. 4 in an assembled, expanded state.

Once the wedge segments 420–428 have been slid onto the rail 410, the fastener 450 may connect to the rail 410 via the wedge lock attachment opening 460 in a well-known manner. FIG. 5 illustrates the expanding device 400 of FIG. 4 in an assembled, unexpanded state. As illustrated, when the expanding device 400 is in an unexpanded state, a gap may exist between the expanding device 400 and the processing module 240. By tightening the fastener 450, the expanding device 400 expands to fill the gap, as illustrated in FIG. 6. In such a position, the expanding device 400 causes the dovetail interface of the processing module 240 to come in contact with the frame 230 thereby improving thermal dissipation.

Figure 7:
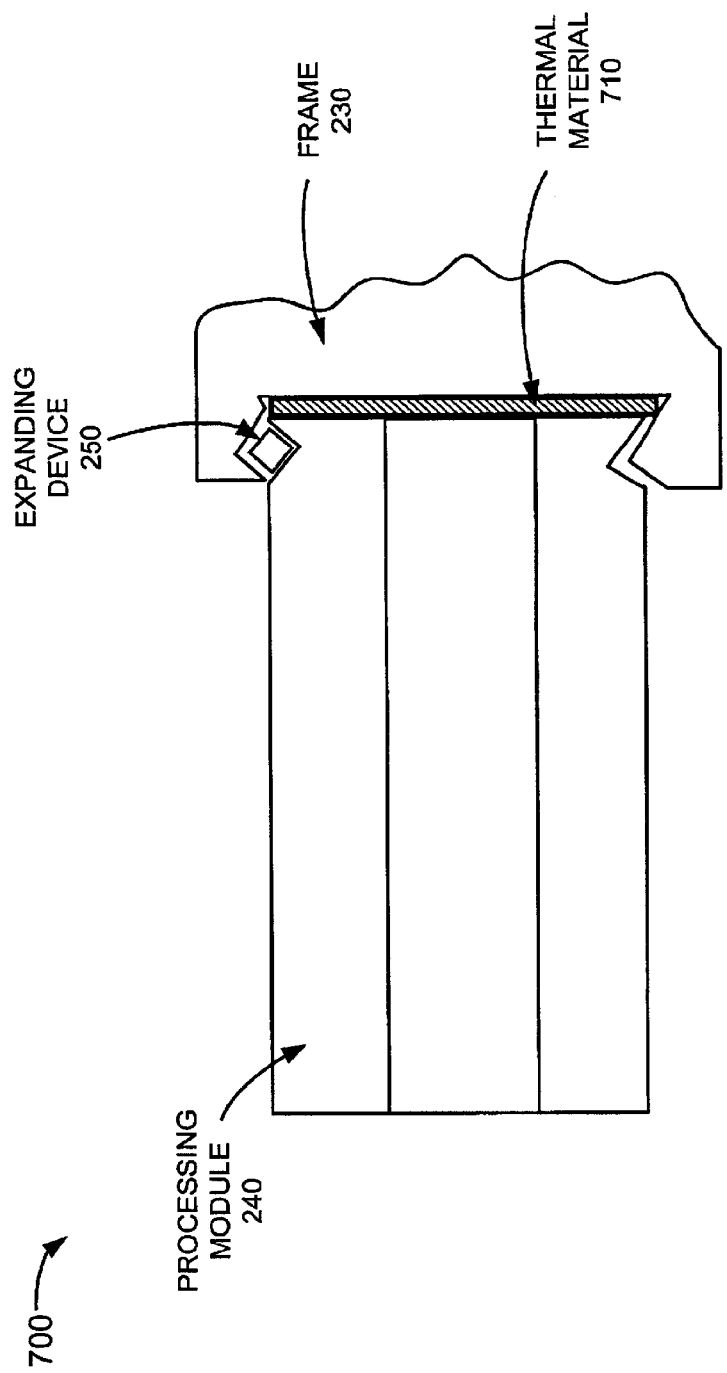
FIG. 7 illustrates an exemplary configuration of the processing module/frame interface in an alternative implementation consistent with the present invention.

FIG. 7 illustrates an exemplary configuration of the processing module/frame interface 700 in an alternative implementation consistent with the present invention. As illustrated, gap-filling thermal material 710 is positioned between the dovetail end of the processing module 240 and the frame 230. The thermal material 710 may include any type of material (e.g., a mica-filled epoxy) that facilitates heat transfer from the processing module 240 to the frame 230. The thermal material 710 may be applied uniformly to the frame 230 at a thickness to maximize heat transfer through the thermal material 710 to the frame 230. While shown to fill only part of the gap between the processing module 240 and frame 230, the thermal material 710 may fill a larger or smaller part of the gap. With the thermal material 710 in place, the transfer of heat from the processing module 240 to the frame 230 is improved.

Figure 8:
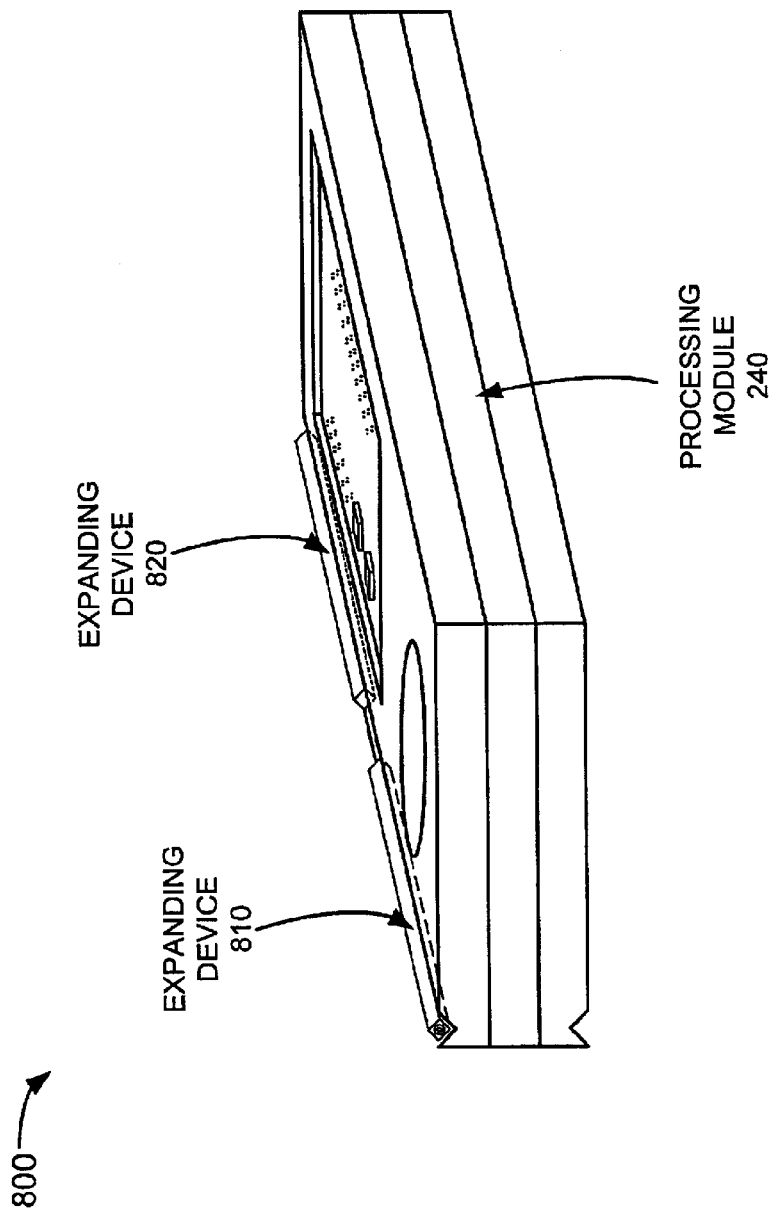
FIG. 8 illustrates an exemplary configuration of the dovetail interface in another implementation consistent with the present invention.

FIG. 8 illustrates an exemplary configuration of the dovetail interface 800 in another implementation consistent with the present invention. Depending upon the length of the processing modules 240–246, two or more expanding devices may be used to lock the processing modules 240–246 in place within the frame 230. For simplicity, two expanding devices 810 and 820 are illustrated in FIG. 8.

The expanding devices 810 and 820 may be configured in a manner similar to the expanding device described above with respect to FIGS. 4–6. For ease of access, expanding devices 810 and 820 may be accessible via different ends of the processing module 240. For smaller processing modules, two or more expanding devices may be desirable to increase the compressive load, thereby supporting greater loads and enhancing thermal performance.

Figure 9:
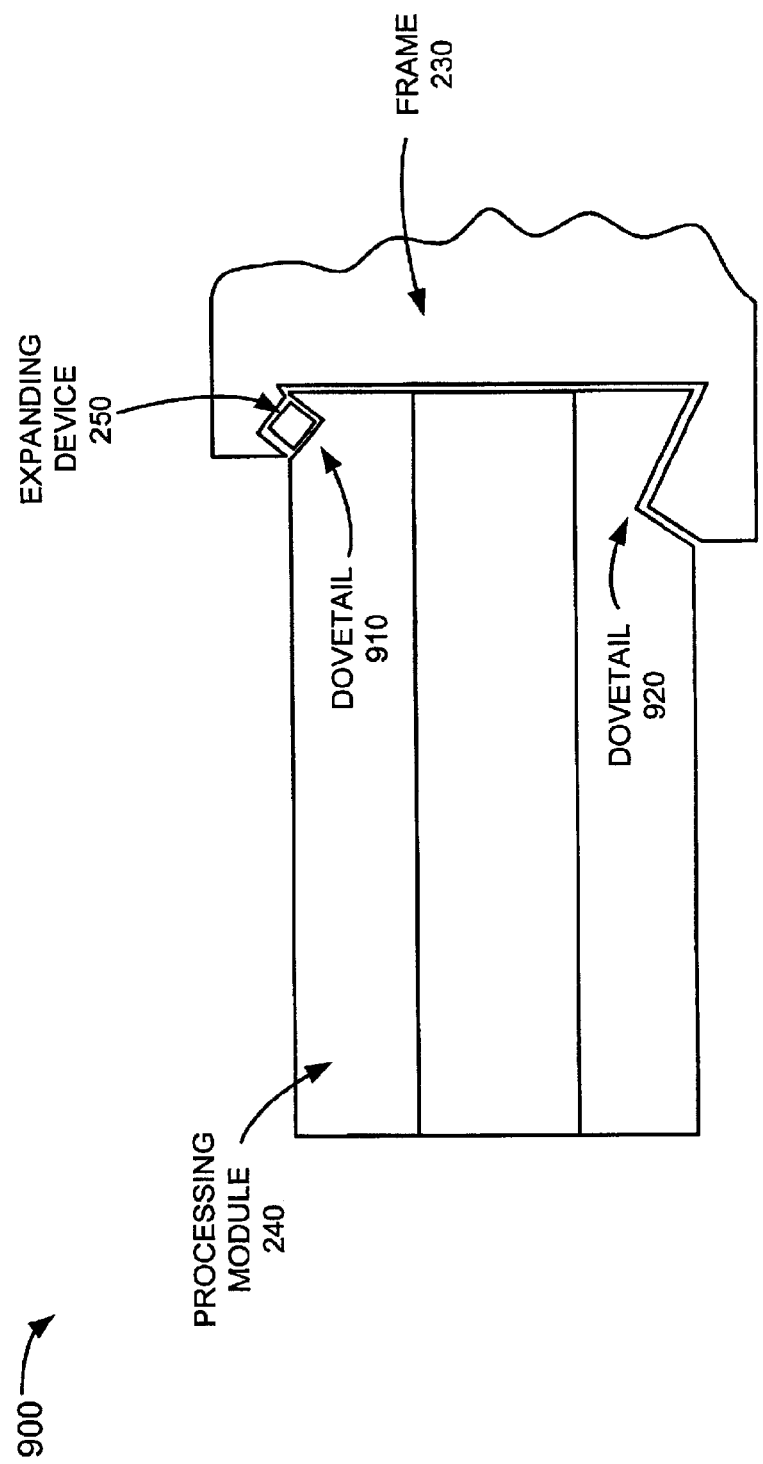
FIG. 9 illustrates an exemplary configuration of the processing module/frame interface in a further implementation consistent with the present invention.

FIG. 9 illustrates an exemplary configuration of the processing module/frame interface 900 in a further implementation consistent with the present invention. As illustrated, the processing module 240 may include dissimilar dovetail interfaces 910 and 920. Dovetail angles may be selected so as to optimize thermal and/or structural performance. As described above, an optimum dovetail angle may be selected based on a variety of factors, such as the mass of the processing module 240, the distance of the center of mass from the base of the sliding dovetail, the direction of any external loads, such as gravity, shock impulses, vibration, centripetal forces, and the like, the width of the sliding dovetail, the desired compression at the interface of the processing module 240 with the frame 230, and the load producing capability of the expanding device 250.

Conclusion

Systems and methods, consistent with the present invention, improve retention of and heat dissipation from processing modules in an underwater device. A dovetail portion of a processing modules is forced into compression with a receiving portion of a frame through the use of an expanding device. As a result, heat transfer to the frame is enhanced.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the above description focused on an underwater environment, implementations consistent with the present invention are not so limited. For example, the dovetail interface could alternatively be implemented in other environments, such as ground-based, space, or aerospace environments.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. An optical processing device comprising:
    a plurality of processing modules, a portion of each of the processing modules being configured in a dovetail shape;
    a frame configured to receive the dovetail end of the processing modules; and
    at least one expanding device configured to lock the dovetail end of the processing modules to the frame.

2. The optical processing device of claim 1 wherein the expanding device includes a wedge lock.

3. The optical processing device of claim 1 wherein the dovetail end of each processing module includes two dovetail angles, and
    wherein the two dovetail angles are substantially equal.

4. The optical processing device of claim 1 wherein the dovetail end of each processing module includes two dovetail angles, and
    wherein the dovetail angles are different.

5. The optical processing device of claim 1 wherein the dovetail end of each processing module includes two dovetail angles, and wherein at least one of the two dovetail angles is between 30 and 75 degrees.

6. The optical processing device of claim 1 wherein the frame is further configured to:

act as a heat sink for the processing modules.

7. The optical processing device of claim 6 further comprising:

a thermal interface positioned between the dovetail end of the processing modules and the frame, the thermal interface being configured to enhance heat transfer to the frame.

8. The optical processing device of claim 1 wherein one of the expanding devices is associated with each processing module.

9. The optical processing device of claim 1 wherein a plurality of the expanding devices is associated with each processing module.

10. The optical processing device of claim 1 wherein the at least one expanding device is configured to attach to the dovetail end of the processing modules prior to insertion in the frame.

11. The optical processing device of claim 1 wherein the at least one expanding device is configured to attach to the frame.

12. The optical processing device of claim 1 wherein the at least one expanding device includes a non-expanded state and an expanded state, and wherein the at least one expanding device is further configured to:

allow the frame to receive the processing modules when in the non-expanded state, and lock the processing modules in place when in the expanded state.

13. The optical processing device of claim 1 wherein the optical processing device includes an underwater repeater.

14. The optical processing device of claim 1 wherein the expanding device includes:

a rail, and a wedge lock configured to attach to the rail.

15. The optical processing device of claim 1 wherein the expanding device is configured to lock the processing module within the frame in a cantilevered state.

16. A retainer comprising:

a device configured with at least one dovetail-shaped portion;

a frame configured to receive the dovetail-shaped portion; and at least one expanding device configured to compress the dovetail-shaped portion against the frame.

17. The retainer of claim 16 wherein the dovetail-shaped portion includes two dovetail angles, and wherein the two dovetail angles are substantially equal.

18. The retainer of claim 16 wherein the dovetail-shaped portion includes two dovetail angles, and wherein the dovetail angles are different.

19. The retainer of claim 16 wherein the dovetail-shaped portion includes two dovetail angles, and wherein each of the dovetail angles is between 30 and 75 degrees.

20. The retainer of claim 16 wherein the at least one expanding device includes a wedge lock.

21. The retainer of claim 16 wherein the at least one expanding device includes two or more wedge locks.

22. The retainer of claim 16 wherein the at least one expanding device includes:

a rail, and a plurality of wedge segments configured to attach to the rail and enter a non-expanded state and an expanded state.

23. The retainer of claim 22 wherein, when in the non-expanded state, the at least one expanding device allows the frame to receive the dovetail-shaped portion.

24. The retainer of claim 16 wherein the at least one expanding device is further configured to:

attach to the device.

25. The retainer of claim 16 wherein the at least one expanding device is further configured to:

attach to the frame.

26. The retainer of claim 16 wherein the at least one expanding device includes one or more of a tapered shim, a linear expander, and a wedge lock.

27. A method for retaining a device, comprising a dovetail portion, in a frame, the method comprising:

attaching at least one expanding device to one of the dovetail portion and the frame;

sliding the dovetail portion into the frame; and expanding the at least one expanding device to retain the dovetail portion in the frame.

28. The method of claim 27 wherein the expanding device includes one or more of a wedge lock, a tapered shim, and a linear expander.

29. The method of claim 27 wherein the attaching includes:

attaching a rail to one of the dovetail portion and the frame, and sliding a plurality of wedge segments onto the rail.

30. A system for retaining a device, comprising a dovetail portion, in a frame, comprising:

means for attaching at least one expanding device to one of the dovetail portion and the frame;

means for sliding the dovetail portion into the frame; and means for expanding the at least one expanding device to retain the dovetail portion in the frame.

31. A method for dissipating heat from a processing module, comprising a dovetail portion, to a frame, the method comprising:

attaching at least one expanding device to one of the dovetail portion and the frame;

inserting the dovetail portion into the frame; and expanding the at least one expanding device to bring the dovetail portion into contact with the frame and allow for heat to dissipate from the processing module to the frame.

* * * * *